US010601185B2

(12) United States Patent
Ishikawa et al.

(10) Patent No.: US 10,601,185 B2
(45) Date of Patent: Mar. 24, 2020

(54) DIFFERENTIAL TRANSMISSION CABLE MODULE

(71) Applicant: Hitachi Metals, Ltd., Tokyo (JP)

(72) Inventors: Hiroshi Ishikawa, Tokyo (JP); Takahiro Sugiyama, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 16/233,224

(22) Filed: Dec. 27, 2018

(65) Prior Publication Data

US 2019/0214774 A1 Jul. 11, 2019

(30) Foreign Application Priority Data

Jan. 10, 2018 (JP) .................. 2018-001560

(51) Int. Cl.
| | |
|---|---|
| H01R 13/6592 | (2011.01) |
| H01B 11/18 | (2006.01) |
| H01R 12/53 | (2011.01) |
| H01R 12/75 | (2011.01) |
| H01B 11/12 | (2006.01) |
| H04B 3/50 | (2006.01) |
| H04L 25/02 | (2006.01) |

(52) U.S. Cl.
CPC ......... *H01R 13/6592* (2013.01); *H01B 11/12* (2013.01); *H01B 11/1891* (2013.01); *H01R 12/53* (2013.01); *H01R 12/75* (2013.01); *H04B 3/50* (2013.01); *H04L 25/02* (2013.01)

(58) Field of Classification Search
CPC .................................................. H01R 13/6592
USPC ....................................................... 174/260
See application file for complete search history.

(56) References Cited

U.S. PATENT DOCUMENTS

| | | | |
|---|---|---|---|
| 6,250,936 B1 * | 6/2001 | Armistead ............. | H01R 9/035 333/24 R |
| 9,728,904 B2 | 8/2017 | Yamada et al. | |
| 2008/0004819 A1 * | 1/2008 | Namba .................. | G01R 27/28 702/65 |

(Continued)

FOREIGN PATENT DOCUMENTS

JP          5214056 B1      6/2013

*Primary Examiner* — Stanley Tso
(74) *Attorney, Agent, or Firm* — Scully, Scott, Murphy & Presser, PC

(57) ABSTRACT

A differential transmission cable module used for transmitting a differential signal between electronic devices. The module includes a cable including one inner conductor, a dielectric covering the inner conductor, and an outer conductor covering the dielectric, a sending-end substrate provided at one end of the cable, and a receiving-end substrate provided at an other end of the cable. The sending-end substrate includes two sending-end signal conductors, a sending-end ground conductor, and a sending-end signal converter for converting a differential signal transmitted through the sending-end conductors into a differential signal transmitted through the inner and outer conductors. The receiving-end substrate includes two receiving-end signal conductors, a receiving-end ground conductor, and a receiving-end signal converter for converting the differential signal transmitted through the inner and outer conductors into a differential signal transmitted through the receiving-end conductors. The cable transmits a differential signal by the inner and outer conductors.

10 Claims, 7 Drawing Sheets

(56) References Cited

U.S. PATENT DOCUMENTS

| | | | |
|---|---|---|---|
| 2015/0188432 A1* | 7/2015 | Vannorsdel | H02M 3/156 |
| | | | 323/271 |
| 2015/0333450 A1 | 11/2015 | Yamada et al. | |
| 2016/0335388 A1* | 11/2016 | Hayashi | G06F 17/5068 |
| 2018/0048094 A1* | 2/2018 | Cornelius | H01R 13/6473 |
| 2018/0138595 A1* | 5/2018 | Nysen | H01Q 1/246 |

\* cited by examiner

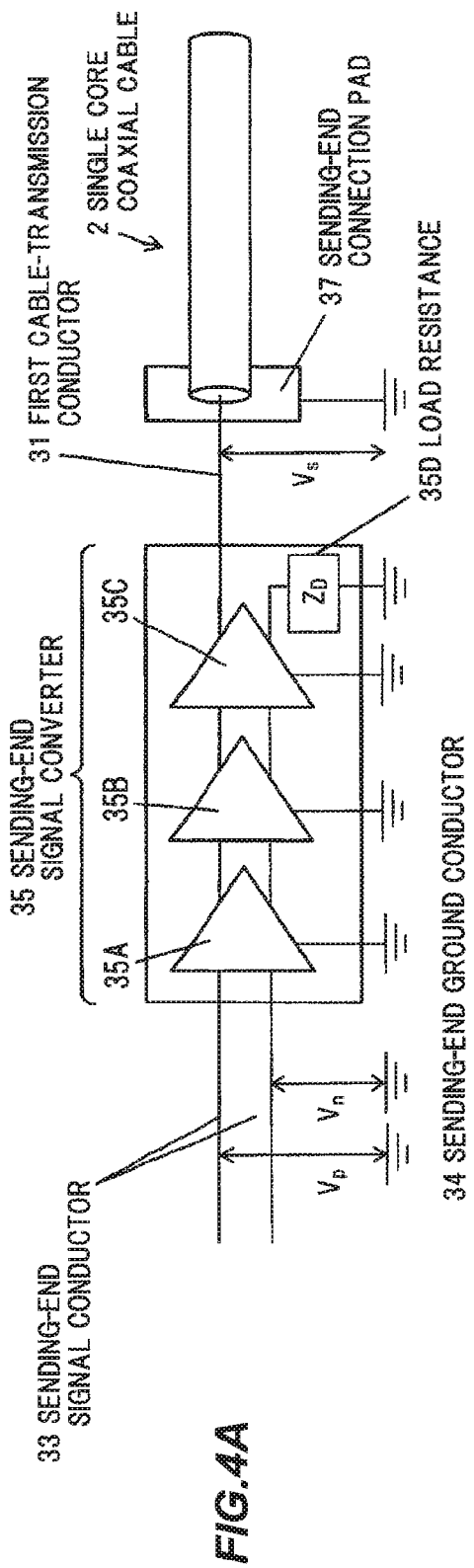
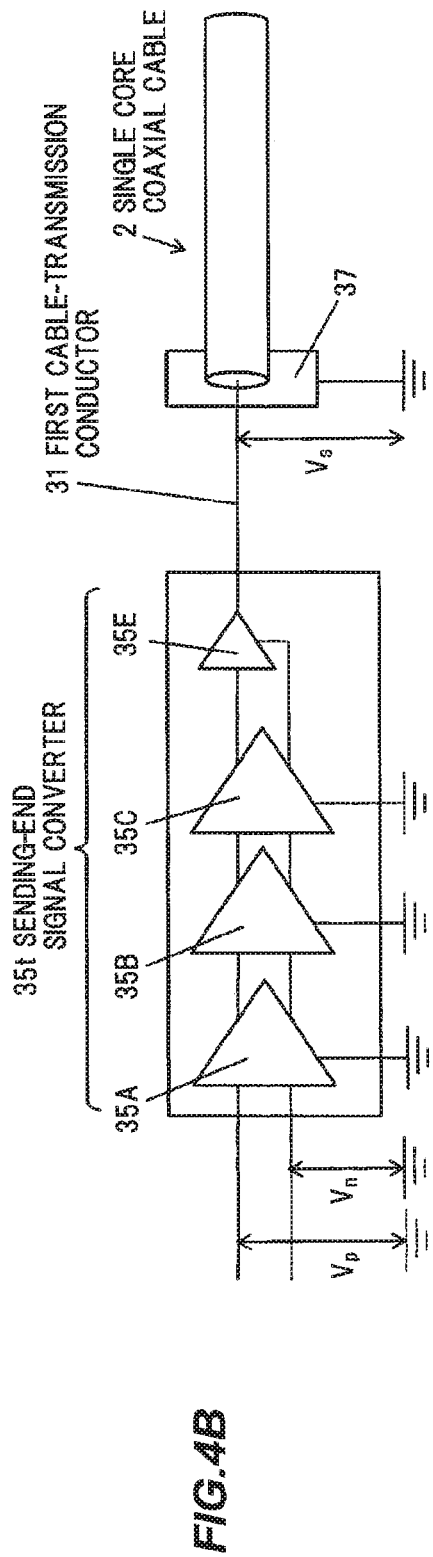
FIG.4A
FIG.4B

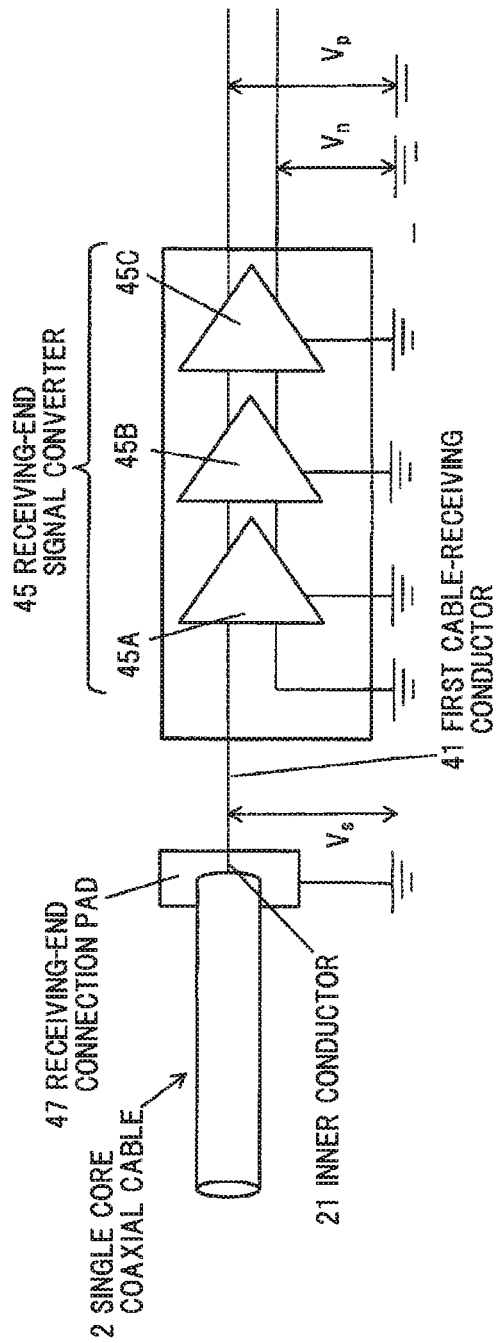

DIFFERENTIAL TRANSMISSION CABLE MODULE

The present application is based on Japanese patent application No. 2018-001560 filed on Jan. 10, 2018, the entire contents of which are incorporated herein by reference.

BACKGROUND OF THE INVENTION

1. Field of the Invention

The invention relates to a differential transmission cable module used for transmitting a differential signal between electronic devices.

2. Description of the Related Art

Differential signaling is conventionally used for high-speed electrical signal transmission. In known differential signal transmission cables, three or more conductors are used to transmit one type of differential signal for the following reasons.

Firstly, to provide an outgoing path and a return path for electric current and also to define characteristic impedance of wiring, at least two conductors to be current paths are generally required in electrical wiring used for high-speed transmission. This is the minimum number of conductors required for electrical wiring used for high-speed transmission.

However, conductor wiring pattern on a printed circuit board constituting an electronic device is different in each device and this causes a problem that it is hard to accurately predict the amount of high-frequency noise to be generated. For this reason, electrical wiring for high-speed transmission on a printed circuit board is generally configured as differential transmission wiring.

In the differential transmission wiring, an outgoing conductor is arranged close to a return conductor, and the shape of the outgoing conductor and the shape of the return conductor are symmetric to each other. This allows high-frequency noise generated by the outgoing conductor and that generated by the return conductor to cancel each other out in the differential transmission wiring. Thus, the noise electromagnetic field level can be reduced in the differential transmission wiring. In this case, in order to even out the characteristic impedance of the differential transmission wiring in a longitudinal direction, it is necessary to arrange one or more wide ground conductors near the outgoing conductor and the return conductor. Therefore, in differential transmission wiring on a printed circuit board, at least three or more conductors consisting of one or more outgoing conductors, one or more return conductors and one or more ground conductors are required to transmit one type of differential signal.

Differential signal transmission cable is used to connect differential transmission wirings on different printed wiring boards to each other. Known differential signal transmission cable connects an outgoing conductor, a return conductor and a ground conductor constituting differential transmission wiring on a printed wiring board respectively to those of another printed wiring board. Thus, known differential signal transmission cable is configured to use at least three or more conductors consisting of one or more outgoing conductors, one or more return conductors and one or more ground conductors to transmit one type of differential signal.

FIGS. 7 and 8 show examples of structure of known differential signal transmission cable and connection structure between known differential signal transmission cable and printed circuit board.

A differential signal transmission cable 102 shown in FIG. 7 is configured to have two signal line conductors 121, a single layer of a shield conductor 122 serving as a ground conductor, and one drain wire 123. The two signal line conductors 121 are connected to two signal conductors 133 formed on a printed circuit board 103, and the drain wire 123 is connected to one ground conductor 134. In the differential signal transmission cable 102, the number of ground conductors is one when the shield conductor 122 is electrically connected to the drain wire 123, and the number of ground conductors is two when the shield conductor 122 is not appropriately electrically connected to the drain wire 123. Thus, in the example shown in FIG. 7, the number of conductors constituting the cable is three or four.

A differential signal transmission cable 202 shown in FIG. 8 is configured to have two signal line conductors 221 and a single layer of a shield conductor 222 serving as a ground conductor. The two signal line conductors 221 are connected to two signal conductors 233 formed on a printed circuit board 203, and the shield conductor 222 is connected to a ground conductor 234. In the example shown in FIG. 8, the number of conductors constituting the cable is three.

Meanwhile, a differential signal transmission cable described in Japanese patent No. 5214056 is configured to have two signal line conductors and two layers of shield conductors serving as ground conductors. In the differential signal transmission cable described in Japanese patent No. 5214056, one of the two layers of shield conductors is not electrically connected to anywhere and intra-pair skew is thereby reduced without increase in transmission loss of differential signal. Thus, in the example described in Japanese patent No. 5214056, the number of conductors constituting the cable is four.

As such, the known differential signal transmission cables use three or more conductors to handle one type of differential signal.

SUMMARY OF THE INVENTION

Along with an increase in data transmission quantity in recent years, there is an increasing demand to connect as many differential signal transmission cables as possible to one printed circuit board. To achieve this, the outer diameter of the differential signal transmission cable needs to be reduced to smaller than known cable. However, if the outer diameter of signal line conductor is reduced so that the differential signal transmission cable can have a smaller outer diameter, a problem may arise that the electrical resistance of the signal line conductor is increased, causing a decrease in a transmission distance of differential signal. Also, if only the outer diameter of insulation is reduced without changing the outer diameter of the signal line conductor so that the differential signal transmission cable can have a smaller outer diameter, a problem may arise that the characteristic impedance of differential signal is off the optimal value which is about 100 Ω, and this causes a decrease in the transmission distance of differential signal in a certain frequency range. Thus, the known differential signal transmission cables may have a problem that a decrease in signal transmission rate or transmission distance is unavoidable if the outer diameter of the differential signal transmission cable is reduced.

It is an object of the invention to provide a differential transmission cable module that has a cable outer diameter smaller than the known differential signal transmission cables without causing a decrease in transmission rate and transmission distance of differential signal.

According to an embodiment of the invention, a differential transmission cable module used for transmitting a differential signal between electronic devices comprises:

a cable comprising one inner conductor, a dielectric covering an outer circumferential surface of the inner conductor, and an outer conductor covering an outer circumferential surface of the dielectric;

a sending-end substrate provided at one end of the cable; and a receiving-end substrate provided at an other end of the cable, wherein the sending-end substrate comprises two sending-end signal conductors to be connected to one of the electronic devices, a sending-end ground conductor to be connected to the one of the electronic devices, and a sending-end signal converter for converting a differential signal transmitted through the two sending-end signal conductors and the sending-end ground conductor into a differential signal transmitted through the inner and outer conductors, wherein the receiving-end substrate comprises two receiving-end signal conductors to be connected to an other of the electronic devices, a receiving-end ground conductor to be connected to the other of the electronic devices, and a receiving-end signal converter for converting the differential signal transmitted through the inner and outer conductors into a differential signal transmitted through the two receiving-end signal conductors and the receiving-end ground conductor, and wherein the cable transmits a differential signal by the inner and outer conductors.

EFFECTS OF THE INVENTION

According to an embodiment of the invention, a differential transmission cable module can be provided that has a cable outer diameter smaller than the known differential signal transmission cables without causing a decrease in transmission rate and transmission distance of differential signal.

BRIEF DESCRIPTION OF THE DRAWINGS

Next, the present invention will be explained in more detail in conjunction with appended drawings, wherein:

FIG. 4A is a circuit diagram illustrating a sending-end signal converter 35 in the first embodiment;

FIG. 4B is a circuit diagram illustrating another configuration example of the sending-end signal converter 35;

FIG. 5 is a circuit diagram illustrating a receiving-end signal converter 45 in the first embodiment;

DETAILED DESCRIPTION OF THE PREFERRED EMBODIMENTS

To solve the above-mentioned problem, the present inventors focused on a significant difference in how high-frequency noise is generated between wiring in cable and printed circuit board wiring. Firstly, in wiring in cable, the wiring pattern cannot be freely changed and a path of high-frequency noise generation is thus predictable, unlike printed circuit board wiring. Secondly, in wiring in cable, change in the characteristic impedance thereof due to the surrounding environment can be prevented by providing a structure in which an outgoing conductor is covered with a return conductor (or a structure in which a return conductor is covered with an outgoing conductor). Therefore, in wiring in cable, as long as a high-frequency transmission path is composed of one outgoing conductor and one return conductor provided therearound, high-frequency noise resistance performance and stability of the characteristic impedance are not greatly impaired even when transmitting a signal through only two conductors. In addition, the return conductor can be configured to also serve as a ground conductor. It is possible to further increase high-frequency noise resistance performance and stability of the characteristic impedance when the return conductor also serves as the ground conductor.

As such cable configured to have one outgoing conductor and one return conductor provided therearound, it is possible to use, e.g., a single core coaxial cable. By using a single core coaxial cable, at least one conductor can be omitted, and furthermore, the cable outer diameter can be reduced to smaller than known differential signal transmission cables while suppressing a decrease in transmission rate and transmission distance of differential signal.

On the other hand, printed circuit board wiring for transmitting differential signal is composed of three or more conductors. Thus, printed circuit board wiring as-is cannot be connected to wiring in cable composed of two conductors. Therefore, in the invention, signal converters for converting a signal are provided so that a differential signal can be transmitted between printed circuit board wiring composed of three or more conductors and wiring in cable composed of two conductors.

Embodiments of the invention will be described below in reference to the drawings.

First Embodiment

Figure 1:
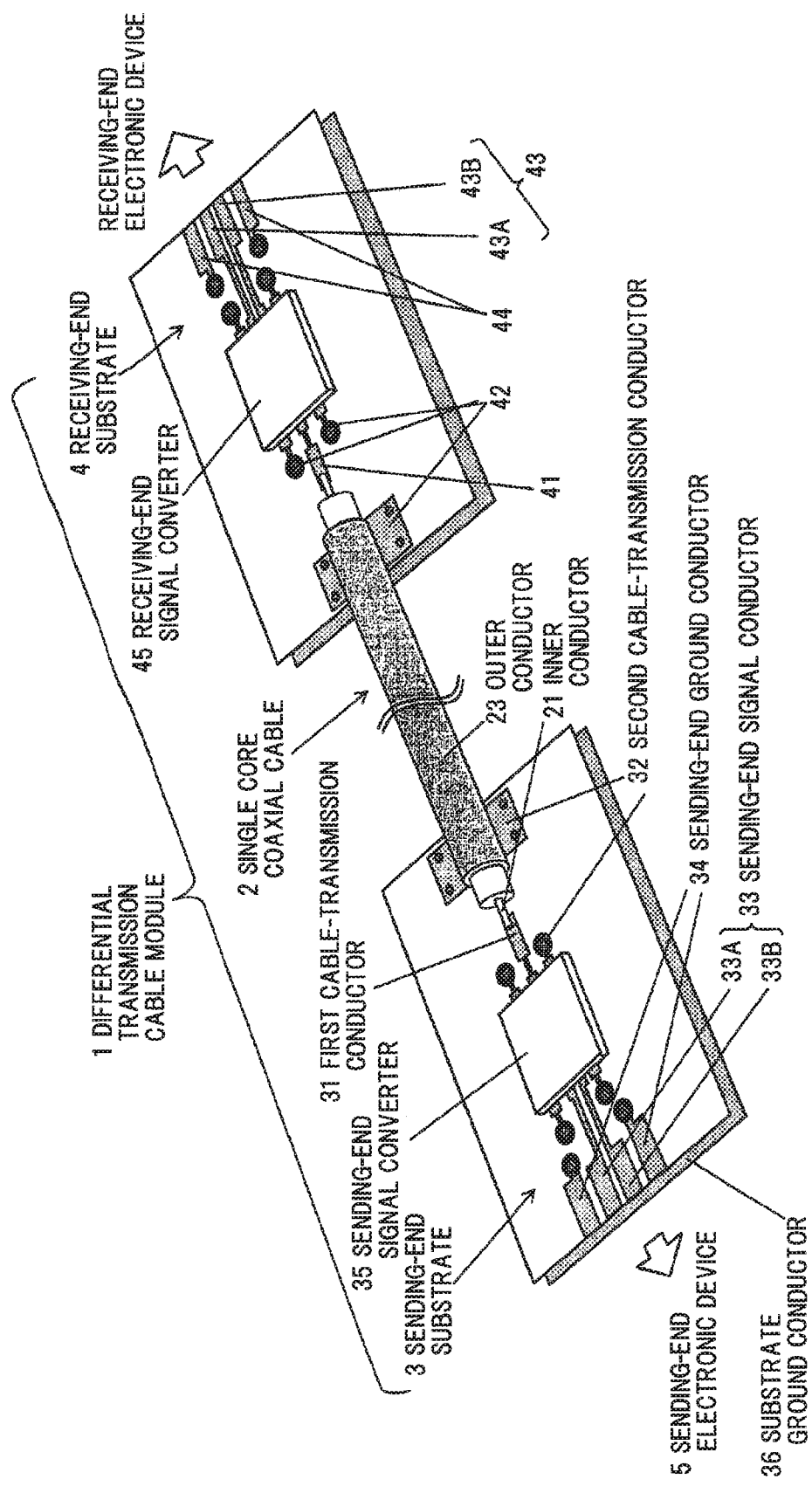
FIG. 1 is a general view showing a differential transmission cable module 1 in the first embodiment.

FIG. 1 is a general view showing a differential transmission cable module 1 in the first embodiment of the invention. The differential transmission cable module 1 has a cable 2, a sending-end substrate 3 and a receiving-end substrate 4.

The differential transmission cable module 1 is used to connect, e.g., between electronic devices using differential signals at a frequency of not less than 10 GHz, such as server, router or storage, or between electronic circuits inside such electronic device.

The sending-end substrate 3 and the receiving-end substrate 4 can be arranged, e.g., inside connectors defined by a common standard such as SFP+ (Small Form-factor Pluggable+) or QSFP (Quad Small Form-factor Pluggable). The differential transmission cable module 1 can constitute a direct attach cable, or an active copper cable, provided with such connectors.

The differential transmission cable module 1 can also be used to connect video equipment of every kind using differential signals at a frequency of several GHz, to PC, in-car equipment, medical device or gaming device, etc. However, these are mentioned as only examples and the differential transmission cable module 1 of the invention can be generally used in an application requiring a thin and broadband differential signal transmission cable.

Figure 2:
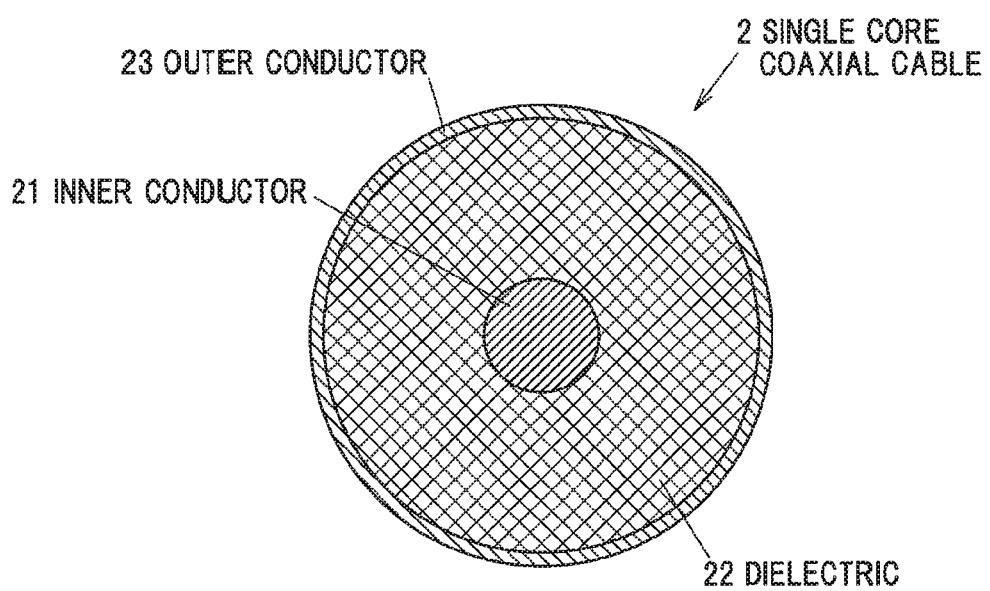
FIG. 2 is a radial cross-sectional view showing a single core coaxial cable 2 in the first embodiment.

A single core coaxial cable can be suitably used as the cable 2 of the invention. FIG. 2 is a radial cross-sectional view showing the single core coaxial cable 2.

The single core coaxial cable 2 is provided with one inner conductor 21, a dielectric 22 covering the outer circumferential surface of the inner conductor 21, and an outer conductor 23 covering the outer circumferential surface of the dielectric 22. The dielectric 22 insulates between the inner conductor 21 and the outer conductor 23. The inner conductor 21 and the outer conductor 23 are two conductors of the single core coaxial cable 2.

When an outgoing current flows through the inner conductor 21, a return current flows through the outer conductor 23. At this time, the outer conductor 23 serves as a ground conductor for the inner conductor 21. Thus, the outer conductor 23 also has a shielding function by which a noise electromagnetic field outside the single core coaxial cable 2 is prevented from penetrating the single core coaxial cable 2.

The inner conductor 21 is a solid wire formed of a conductive material such as copper and a surface thereof may be plated. Alternatively, the inner conductor 21 may be a twisted wire formed by twisting plural conductive wires when the single core coaxial cable 2 is required to have flexibility.

The outer conductor 23 is, e.g., a copper foil tape spirally wound or longitudinally wrapped around the dielectric 22. The copper foil tape may be a laminated tape having a copper foil formed on a surface of a plastic tape. Alternatively, the outer conductor 23 may be a copper thin film plated on a surface of the dielectric 22.

As the dielectric 22, it is possible to use, e.g., polyethylene, polyethylene foam, fluorine resin and foamed fluorine resin. The thickness of the dielectric 22 is determined so that the characteristic impedance of a differential signal transmitted through the single core coaxial cable 2 falls within the range from 45 to 105 Ω.

The single core coaxial cable 2 is a single core cable having one inner conductor 21 as a core and thus can be reduced in diameter as compared to the known differential signal transmission cable having a pair of parallel conductors as signal lines. In addition, wiring in the single core coaxial cable 2 consists of two conductors, which is less than known, and also the diameter of the single core coaxial cable 2 is small, allowing for the lower manufacturing cost than the known differential signal transmission cable.

One first cable-transmission conductor 31 connected to the single core coaxial cable 2 and at least one second cable-transmission conductor 32 are formed on the sending-end substrate 3. Two sending-end signal conductors 33A and 33B to be connected to a sending-end electronic device 5 and at least one sending-end ground conductor 34 are also formed on the sending-end substrate 3. In addition, a sending-end signal converter 35 is provided between the first cable-transmission conductor 31/the second cable-transmission conductor 32 and the sending-end signal conductors 33A,33B/the sending-end ground conductors 34. A substrate ground conductor 36 is formed on the back of the sending-end substrate 3.

Likewise, one first cable-receiving conductor 41 connected to the single core coaxial cable 2, at least one second cable-receiving conductor 42, two receiving-end signal conductors 43A and 43B to be connected to a receiving-end electronic device 6 and at least one receiving-end ground conductor 44 are formed on the receiving-end substrate 4. In addition, a receiving-end signal converter 45 is provided between the first cable-receiving conductor 41/the second cable-receiving conductor 42 and the receiving-end signal conductors 43A, 43B/the receiving-end ground conductors 44.

Energy of the electromagnetic field of the differential signal is present between the sending-end signal conductor (outgoing conductor) 33A and the sending-end ground conductors 34 as well as between the sending-end signal conductor (return conductor) 33B and the sending-end ground conductors 34. Thus, when simply connecting the sending-end signal conductor 33A to the inner conductor 21 of the single core coaxial cable 2 and the sending-end signal conductor 33B to the outer conductor 23 of the single core coaxial cable 2, current and voltage become imbalanced at connecting portions between the sending-end signal conductors 33A,33B and the single core coaxial cable 2, hence, it is not possible to input the differential signal to the single core coaxial cable 2. Likewise, when simply connecting the inner conductor 21 and the outer conductor 23 of the single core coaxial cable 2 to the receiving-end signal conductors 43A and 43B, it is not possible to input the differential signal from the single core coaxial cable 2 to the receiving-end substrate 4.

Therefore, in the invention, the sending-end signal converter 35 is provided to convert the differential signal transmitted through the sending-end signal conductors 33A, 33B and the sending-end ground conductors 34 into the differential signal transmitted through the inner conductor 21 and the outer conductor 23, and the receiving-end signal converter 45 is provided to convert the differential signal transmitted through the inner conductor 21 and the outer conductor 23 into the differential signal transmitted through the receiving-end signal conductors 43A, 43B and the receiving-end ground conductors 44.

Figure 3:
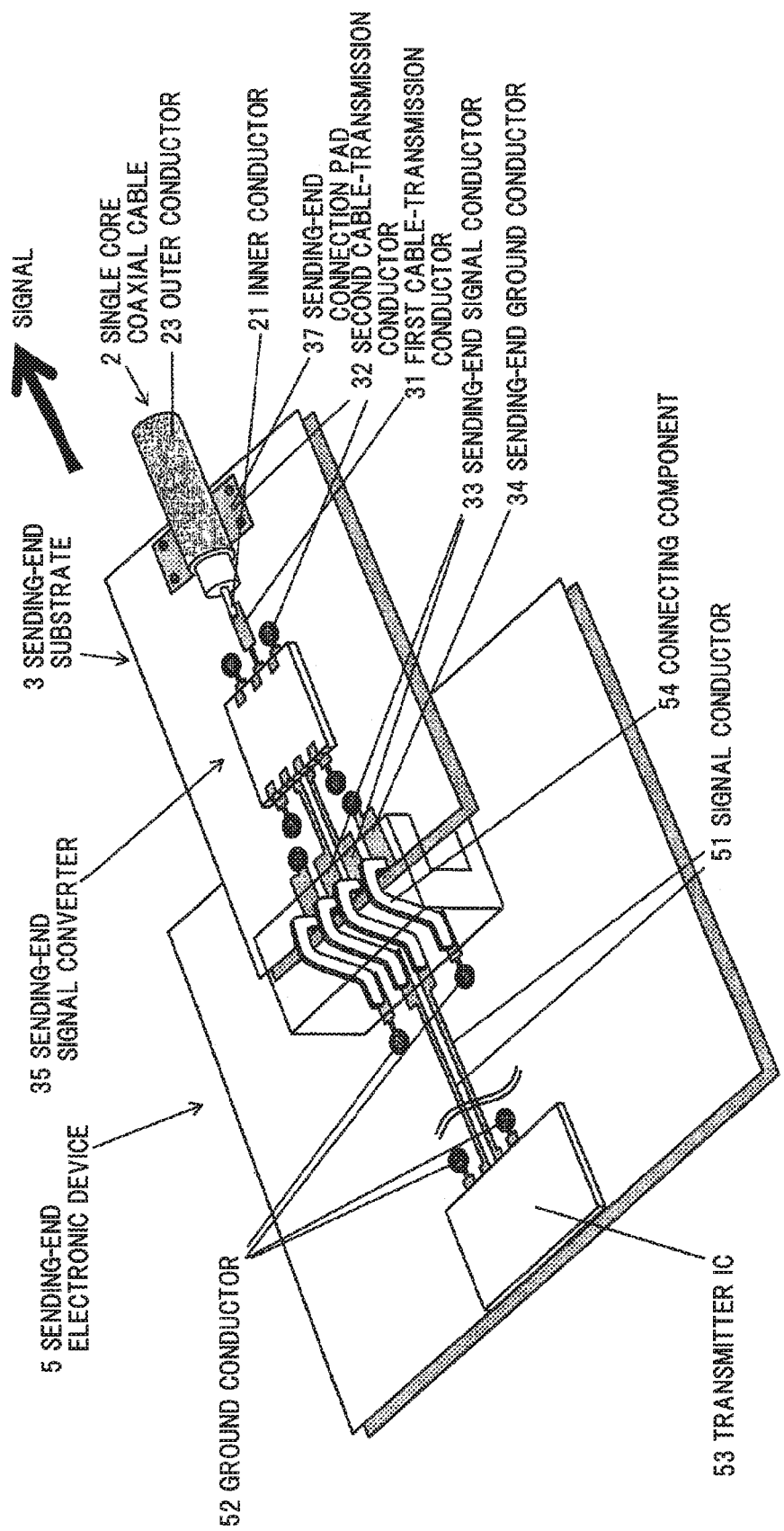
FIG. 3 is a schematic diagram illustrating electrical connection structure between the differential transmission cable module 1 and a sending-end electronic device 5 in the first embodiment.

FIG. 3 is a schematic diagram illustrating electrical connection structure between the differential transmission cable module 1 and the sending-end electronic device 5. The single core coaxial cable 2 is connected to the sending-end electronic device 5 via the sending-end substrate 3.

The sending-end electronic device 5 is provided with a transmitter IC (Integrated Circuit) 53 for sending a differential signal, two signal conductors 51 for transmitting the differential signal sent from the transmitter IC 53, and at least one ground conductor 52 (two ground conductors 52 in the first embodiment). The signal conductors 51 and the ground conductors 52 are connected to the sending-end signal conductors 33 and the sending-end ground conductors 34 of the sending-end substrate 3 via connecting components 54.

The transmitter IC 53 applies voltages, positive and negative with respect to the ground conductor 52, to the two signal conductors 51. Thus, the sending-end electronic device 5 needs to have two signal conductors 51 and at least one ground conductor 52 to transmit one type of differential signal.

The differential signal sent from the transmitter IC 53 is transmitted to the sending-end substrate 3 via the connecting components 54. The sending-end signal converter 35 provided on the sending-end substrate 3 receives the differential signal which is supplied through the two sending-end signal conductors 33 and one or more sending-end ground conductors 34. The sending-end signal converter 35 converts the differential signal transmitted through the two sending-end signal conductors 33 and one or more sending-end ground conductors 34 into the differential signal transmitted through one inner conductor 21 and one outer conductor 23. The differential signal converted and sent by the sending-end signal converter 35 is transmitted to the single core coaxial cable 2 via the first cable-transmission conductor 31 and the second cable-transmission conductor 32.

The differential transmission cable module 1 is also connected to a receiving-end electronic device (not shown). The differential signal supplied from the single core coaxial cable 2 to the receiving-end substrate 4 is converted by the receiving-end signal converter 45 into the differential signal transmitted through the two receiving-end signal conductors 43 and one or more receiving-end ground conductors 44. The converted differential signal is transmitted, via connecting components (not shown), to a receiver IC which is provided on the receiving-end electronic device to receive the differential signal.

FIGS. 4A and 4B are circuit diagrams illustrating the sending-end signal converter 35 in the first embodiment, and FIG. 5 is a circuit diagram illustrating the receiving-end signal converter 45.

In the sending-end signal converter 35 shown in FIG. 4A, the differential signal supplied from the sending-end electronic device 5 passes through the two sending-end signal conductors 33 and are supplied, as voltage Vp and voltage Vn with respect to the sending-end ground conductor 34, to a receiving circuit 35A. In the first embodiment, the characteristic impedance of two inputs of the receiving circuit 35A with respect to the sending-end ground conductors 34 is 50 Ω.

The differential signal consisting of two types of voltage signals is amplified by an amplifier circuit 35B and is then supplied to a driver circuit 35C. The driver circuit 35C is configured that one of the signals is sent as a voltage signal Vs to the first cable-transmission conductor 31 and the other is attenuated by load resistance 35D. In the first embodiment, the characteristic impedance of the first cable-transmission conductor 31 with respect to the second cable-transmission conductor 32 is 50 Ω, and the resistance $Z_D$ of the load resistance 35D is also 50 Ω.

The first cable-transmission conductor 31 is connected to the inner conductor 21 of the single core coaxial cable 2. Meanwhile, the second cable-transmission conductor 32 is connected to the outer conductor 23 of the single core coaxial cable 2. The second cable-transmission conductor 32 is provided with a sending-end connection pad 37 at a portion connected to the outer conductor 23. The width of the sending-end connection pad 37 is preferably larger than the width of the single core coaxial cable 2. With this configuration, it is possible to reduce loss of signal due to electromagnetic radiation at a connecting portion between the second cable-transmission conductor 32 and the outer conductor 23.

Another configuration example of the sending-end signal converter 35 is shown in FIG. 4B. A sending-end signal converter 35t shown in FIG. 4B is the same as FIG. 4A in the configuration from the receiving circuit 35A to the driver circuit 35C, but is different in that differential output of the driver circuit 35C is supplied to a buffer circuit 35E. The buffer circuit 35E outputs a signal to the first cable-transmission conductor 31. In the first embodiment, the characteristic impedance between the first cable-transmission conductor 31 and the second cable-transmission conductor 32 is 50 Ω.

The first cable-transmission conductor 31 is connected to the inner conductor 21 of the single core coaxial cable 2. Meanwhile, the second cable-transmission conductor 32 is connected to the outer conductor 23 of the single core coaxial cable 2. The width of the sending-end connection pad 37 is preferably larger than the width of the single core coaxial cable 2.

Next, the receiving-end signal converter 45 shown in FIG. 5 will be described. The inner conductor 21 of the single core coaxial cable 2 is connected to the first cable-receiving conductor 41 and the outer conductor 23 is connected to the second cable-receiving conductor 42. The second cable-receiving conductor 42 is provided with a receiving-end connection pad 47 at a portion connected to the outer conductor 23. The width of the receiving-end connection pad 47 is preferably larger than the width of the single core coaxial cable 2. With this configuration, it is possible to reduce loss of signal due to electromagnetic radiation at a connecting portion between the second cable-receiving conductor 42 and the outer conductor 23. In the first embodiment, the characteristic impedance between the first cable-receiving conductor 41 and the second cable-receiving conductor 42 is 50 Ω.

Voltage Vs between the first cable-receiving conductor 41 and the second cable-receiving conductor 42 is supplied to one of inputs of the receiving circuit 45A. The other input of the receiving circuit 45A is connected to the second cable-receiving conductor 42 through a via. The signal received by the receiving circuit 45A is amplified by an amplifier circuit 45B and is then supplied to a driver circuit 45C. The driver circuit 45C is configured that voltage Vp and voltage Vn with respect to the receiving-end ground conductors 44 are output to the receiving-end electronic device 6. In the first embodiment, the characteristic impedance of two outputs of the driver circuit 45C is 50 Ω.

The sending-end signal converter 35 and the receiving-end signal converter 45 can be constructed from by ICs.

Second Embodiment

A differential transmission cable module in the second embodiment has the single core coaxial cable 2, the sending-end substrate 3 and the receiving-end substrate 4 (not shown) in the same manner as the first embodiment but is different from the first embodiment in the configuration of the signal converters. In the second embodiment, one or both of the sending-end signal converter 35 and the receiving-end signal converter 45 are composed of passive components.

Figure 6:
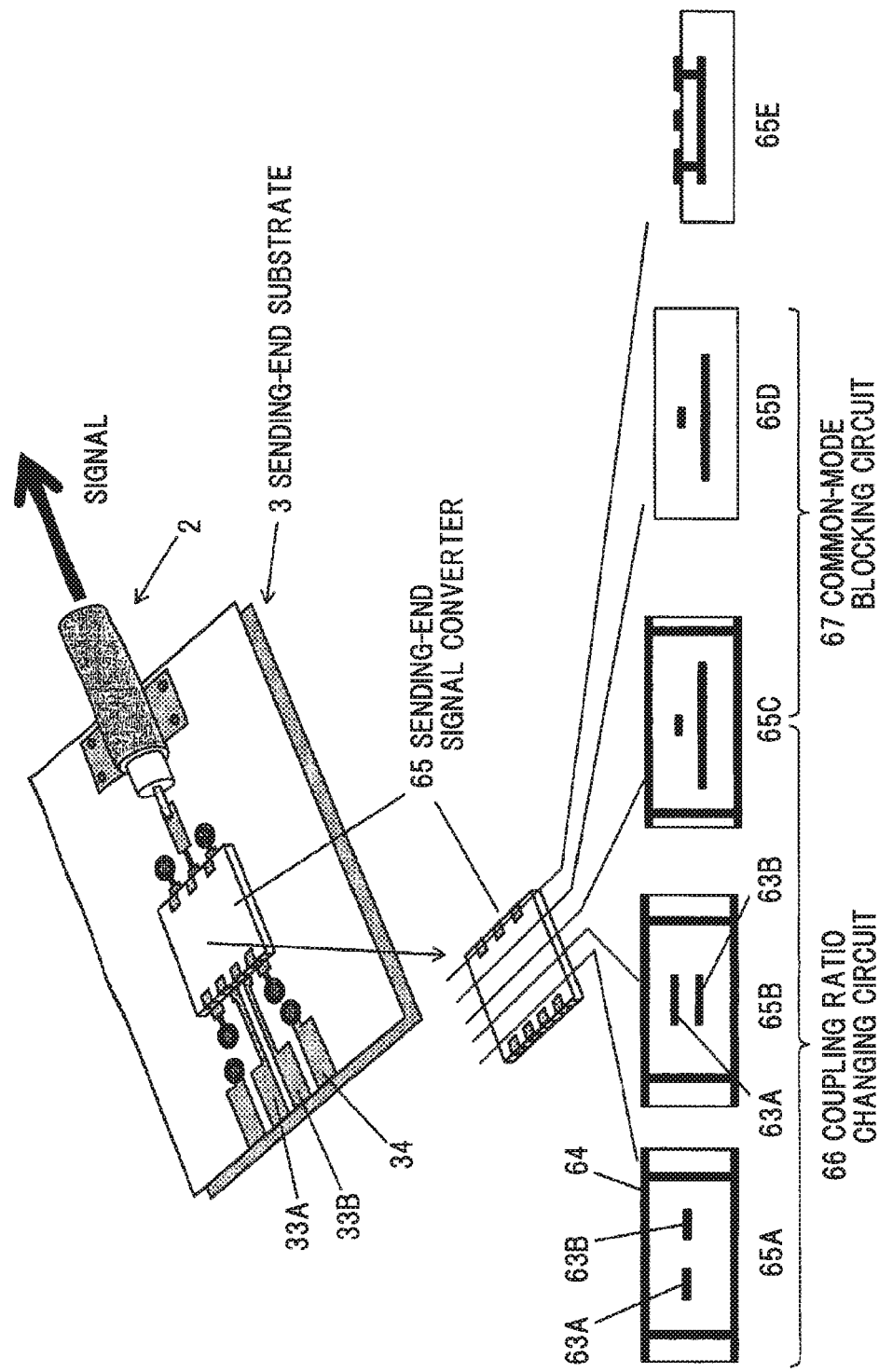
FIG. 6 is a schematic diagram illustrating a sending-end signal converter 65 in the second embodiment.
Figure 7:
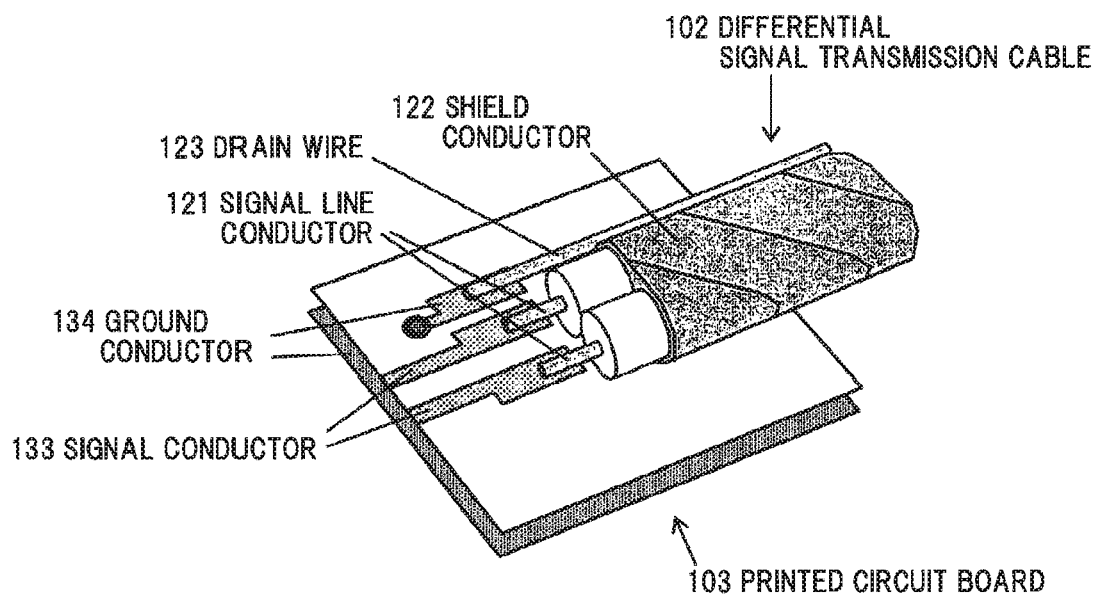
FIG. 7 is a perspective view showing a known differential signal transmission cable.

FIG. 6 is a schematic diagram illustrating a sending-end signal converter 65 in the second embodiment. In the sending-end signal converter 65, a coupling ratio changing circuit 66 for changing a differential coupling ratio and a common-mode blocking circuit 67 for blocking a common-mode signal are cascade-connected.

In the coupling ratio changing circuit 66, the positions and widths of an outgoing conductor 63A and a return conductor 63B are changed so that energy of the differential signal is concentrated therebetween. The coupling ratio changing circuit 66 consists of 65A to 65C. The initial stage (65A) of the coupling ratio changing circuit 66 is provided with the outgoing conductor 63A and the return conductor 63B arranged parallel side by side, and a ground conductor 64 arranged to sandwich the outgoing conductor 63A and the return conductor 63B from above and below. The sending-end signal conductor 33A is connected to the outgoing conductor 63A, the sending-end signal conductor 33B is connected to the return conductor 63B, and the sending-end ground conductors 34 are connected to the ground conductor 64.

Next, the outgoing conductor 63A and the return conductor 63B are arranged parallel one above the other (65B) while maintaining the characteristic impedance of the differential signal at a constant level, and then, the width of the outgoing conductor 63A is reduced and the width of the return conductor 63B is increased (65C). This reduces the characteristic impedance of common-mode signal while maintaining the characteristic impedance of the differential signal at a substantially constant level (e.g., at 100 Ω), and the energy of the differential signal is concentrated between the two conductors (the outgoing conductor 63A and the return conductor 63B).

The common-mode blocking circuit 67 consists of 65C and 65D. The common-mode blocking circuit 67 is configured that the ground conductor 64 is open-ended (disconnected) in the state that the energy of the differential signal is concentrated between the outgoing conductor 63A and the return conductor 63B. That is, the ground conductor 64 above and below the outgoing conductor 63A and the return conductor 63B fades away from the state shown in 65C toward the single core coaxial cable 2 (65D). Although there is a possibility that a common-mode signal to be a noise source is present in differential signal wiring on the printed circuit board, it is possible to input the differential signal to the cable 2 while reflecting the common-mode signal by the common-mode blocking circuit 67 at the open-ended portion of the ground conductor 64 without reflecting the differential signal.

Lastly, the outgoing conductor 63A and the return conductor 63B are exposed on a surface of the sending-end signal converter 65 (65E). The outgoing conductor 63A is connected to the inner conductor 21 of the cable 2, and the return conductor 63B is connected to the outer conductor 23 of the single core coaxial cable 2. In the second embodiment, the characteristic impedance of the single core coaxial cable 2 is 100 Ω±15 Ω.

The outgoing conductor 63A and the return conductor 63B may be arranged oppositely. In this case, one of the outgoing conductor 63A and the return conductor 63B, which is formed to have an increasing width in the coupling ratio changing circuit 66, is preferably connected to the outer conductor 23 of the single core coaxial cable 2.

TABLE 1

|  | Example 1 | Example 2 | Comparative Example |
|---|---|---|---|
| Characteristic impedance | 100 Ω | 50 Ω | 100 Ω |
| Core diameter | 0.321 mm (28 AWG) | 0.912 mm (19 AWG) | 0.409 mm (26 AWG) |
| Long diameter | 2.68 mm | 2.64 mm | 2.62 mm |
| Short diameter |  |  | 1.31 mm |
| Conductor loss @25 GHz | ~2.8 dB/m | ~1.5 dB/m | 3.3 dB/m |
| Dielectric loss @25 GHz | 2.1 dB/m | 2.1 dB/m | 2.1 dB/m |
| Total loss | 4.9 dB/m | 3.6 dB/m | 5.4 dB/m |

Table 1 shows the cable outer diameter and the calculation results of transmission loss per unit length.

EXAMPLE 1

With the structure of the single core coaxial cable 2 shown in FIG. 2, the inner conductor and the outer conductor were formed of copper and the dielectric was formed of polyethylene foam. The core diameter is an outer diameter of the inner conductor 21.

EXAMPLE 2

With the structure of the single core coaxial cable 2 shown in FIG. 2, the inner conductor and the outer conductor were formed of copper and the dielectric was formed of polyethylene foam. The core diameter is an outer diameter of the inner conductor 21. The characteristic impedance of the differential signal was 50 Ω.

COMPARATIVE EXAMPLE

Figure 8:
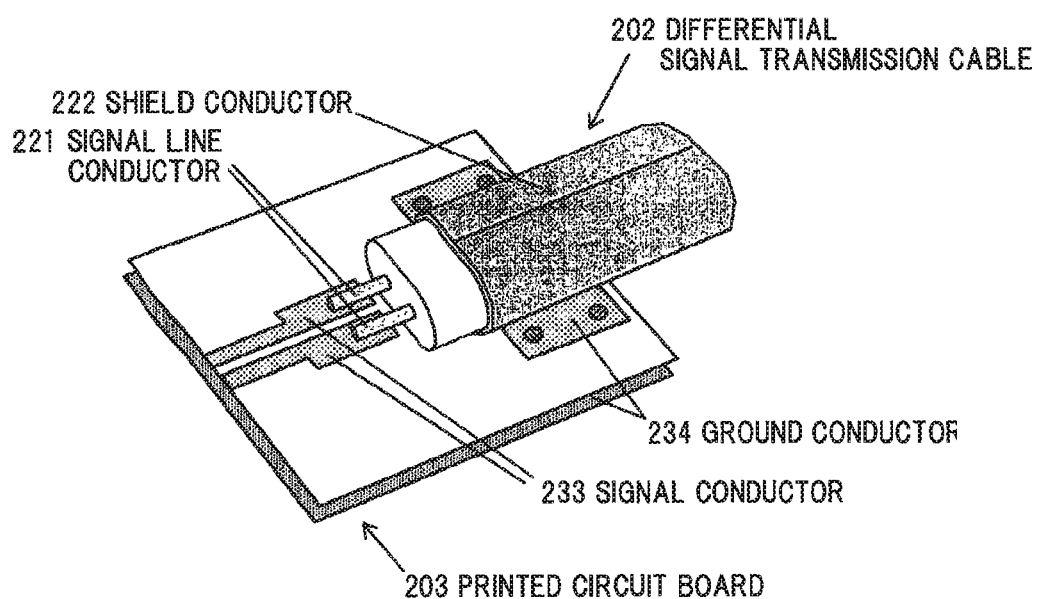
FIG. 8 is a perspective view showing another known differential signal transmission cable.

With the structure of the differential signal transmission cable 202 shown in FIG. 8, the signal line conductors and the shield conductor were formed of copper and the dielectric was formed of polyethylene foam. The core diameter is an outer diameter of each signal line conductor, the long diameter is an outer diameter in an alignment direction of the two signal line conductors, and the short diameter is an outer diameter in a direction orthogonal to the alignment direction of the two signal line conductors.

The cable outer diameter was substantially the same in Examples 1, 2 and Comparative Example. The long diameter is regarded as the cable outer diameter. This is because, on the assumption that the differential signal transmission cable is attached to a printed circuit board, the size of the long diameter of the cable has an impact on package density.

When comparing Example 1 and Comparative Example, conductor loss in Example 1 is smaller despite of having a smaller core diameter. In Comparative Example, since the electromagnetic field is concentrated between the two signal line conductors as viewed in the cable cross section, the signal is transmitted mainly through the facing surfaces of the two signal line conductors. On the other hand, in Example 1, the electromagnetic field is uniformly distributed as viewed in the cable cross section due to having a structure in which the outer conductor covers the inner conductor. Thus, the signal is transmitted through the entire surface of the inner conductor. Therefore, conductor loss is smaller in Example 1 than in Comparative Example.

Meanwhile, when comparing Example 1 and Example 2, transmission loss is smaller in Example 2 than in Example 1. This is because the core diameter in Example 2 is larger than that in Example 1 so as to have characteristic impedance of 50 Ω and conductor loss in Example 2 is thus smaller than that in Example 1. In the invention, since the signal converters are provided, the characteristic impedance of the differential signal can be changed from 100 Ω to 50 Ω at the signal converters, which means that it is possible to use a cable having characteristic impedance of less than 100 Ω to transmit a differential signal.

The above calculation results show that transmission loss per unit length in both Examples 1 and 2 is smaller than that in Comparative Example. Therefore, with the same transmission loss, the outer diameter in Examples 1 and 2 can be smaller than that in Comparative Example.

Functions and Effects of the Embodiments

As described above, the differential transmission cable module 1 is provided with the cable 2 having one inner conductor 21, the dielectric 22 covering the outer circumferential surface of the inner conductor 21 and the outer conductor 23 covering the outer circumferential surface of the dielectric 22, the sending-end substrate 3 provided at one end of the cable 2, and the receiving-end substrate 4 provided at the other end of the cable 2, wherein the sending-end substrate 3 has the two sending-end signal conductors 33 to be connected to an electronic device, the sending-end ground conductors 34 to be connected to the electronic device, and the sending-end signal converter 35 for converting a differential signal transmitted through the two sending-end signal conductors 33 and the sending-end ground conductors 34 into a differential signal transmitted through the inner conductor 21 and the outer conductor 23, the receiving-end substrate 4 has the two receiving-end signal conductors 43 to be connected to another electronic device, the receiving-end ground conductors 44 to be connected to the other electronic device, and the receiving-end signal converter 45 for converting the differential signal transmitted through the inner conductor 21 and the outer conductor 23 into a differential signal transmitted through the two receiving-end signal conductors 43 and the receiving-end ground conductors 44.

As a result, in the differential transmission cable module 1 of the invention, a differential signal can be transmitted through two conductors (the inner conductor 21 and the outer conductor 23) of the cable 2. Thus, in the differential transmission cable module 1 of the invention, the cable for transmitting a differential signal can have a reduced outer diameter without causing a decrease in transmission rate and transmission distance of the differential signal.

Although the embodiments of the invention have been described, the invention according to claims is not to be limited to the embodiments. Further, please note that all combinations of the features described in the embodiments are not necessary to solve the problem of the invention. In addition, the invention can be appropriately modified and implemented without departing from the gist thereof.

For example, two differential transmission cable modules of the invention, arranged with the sending-end and the receiving end oppositely positioned, can be bundled to form a single differential transmission cable module capable of transmitting and receiving differential signals. In this case, the sending-end substrate of the one of the differential transmission cable modules and the receiving-end substrate of the other differential transmission cable module can be arranged in one connector. Furthermore, the sending-end substrate and the receiving-end substrate can be formed by a single printed circuit board.

In addition, plurality (e.g., four or eight, etc.) of such differential transmission cable modules capable of transmitting and receiving differential signals can be bundled to form a differential transmission cable module which can transmit and receive differential signals with multiple channels.

What is claimed is:

1. A differential transmission cable module used for transmitting a differential signal between electronic devices, the module comprising:
    a cable comprising one inner conductor, a dielectric covering an outer circumferential surface of the inner conductor, and an outer conductor covering an outer circumferential surface of the dielectric, the cable being configured to transmit a differential signal by the inner conductor and the outer conductor;
    a sending-end substrate provided at one end of the cable; and
    a receiving-end substrate provided at an other end of the cable,
    wherein each of the sending-end substrate and the receiving-end substrate comprises two signal conductors to be connected to a corresponding electronic device, a ground conductor to be connected to the corresponding electronic device, and a signal converter for converting between a first differential signal to be transmitted through the two signal conductors and the ground conductor and a second differential signal to be transmitted through the inner and outer conductors,
    wherein, in each of the sending-end substrate and the receiving-end substrate, the signal converter comprises a coupling ratio changing circuit being connected to the corresponding electronic device and configured to change a differential coupling ratio, and a common-mode blocking circuit being connected to the coupling ratio changing circuit and the cable and configured to block a common-mode signal,
    wherein the coupling ratio changing circuit comprises:
        a first stage in which an outgoing conductor and a return conductor are arranged parallel side by side and respectively connected to the two signal conductors, and the outgoing conductor and the return conductor are sandwiched by a grounding conductor from above and below;
        a second stage adjacent to the first stage, in which the outgoing conductor and the return conductor are arranged parallel one above the other while maintaining a characteristic impedance of a transmitted differential signal at a constant level, and the outgoing conductor and the return conductor are sandwiched by the grounding conductor from above and below; and
        a third stage adjacent to the second stage, in which a width of the outgoing conductor is reduced and a width of the return conductor is increased, and the outgoing conductor and the return conductor are sandwiched by the grounding conductor from above and below,
    wherein the common mode blocking circuit is configured to reflect the common-mode signal at an open-end portion of the grounding conductor, and
    wherein the outgoing conductor is connected to the inner conductor of the cable and the return conductor is connected to the outer conductor of the cable.

2. The differential transmission cable module according to claim 1, wherein the sending-end substrate further comprises one first cable-transmission conductor connected to the inner conductor and at least one second cable-transmission conductor connected to the outer conductor, and
    wherein the sending-end signal conductors and the sending-end ground conductor are located at one side of the sending-end signal converter and the first and second cable-transmission conductors are located at the other side of the sending-end signal converter.

3. The differential transmission cable module according to claim 2, wherein the second cable-transmission conductor comprises a sending-end connection pad at a portion connected to the outer conductor, and
    wherein a width of the sending-end connection pad is larger than a width of the cable.

4. The differential transmission cable module according to claim 1, wherein the receiving-end substrate further comprises one first cable-receiving conductor connected to the inner conductor and at least one second cable-receiving conductor connected to the outer conductor, and
    wherein the first and second cable-receiving conductors are located at one side of the receiving-end signal converter and the receiving-end signal conductors and the receiving-end ground conductor are located at the other side of the receiving-end signal converter.

5. The differential transmission cable module according to claim 4, wherein the second cable-receiving conductor comprises a receiving-end connection pad at a portion connected to the outer conductor, and
    wherein a width of the receiving-end connection pad is larger than a width of the cable.

6. The differential transmission cable module according to claim 1, wherein the sending-end signal converter reduces characteristic impedance of a differential signal input from the electronic device and then outputs the signal to the cable.

7. The differential transmission cable module according to claim 6, wherein the characteristic impedance of the differential signal in the cable is 50 Ω.

8. The differential transmission cable module according to claim 1, wherein the receiving-end signal converter increases characteristic impedance of a differential signal input from the cable and then outputs the signal to the electronic device.

9. The differential transmission cable module according to claim 8, wherein the characteristic impedance of the differential signal in the cable is 50 Ω.

10. The differential transmission cable module according to claim 1, wherein the cable comprises a single core coaxial cable.

* * * * *